United States Patent [19]

Strasser et al.

[11] Patent Number: 4,793,188

[45] Date of Patent: Dec. 27, 1988

[54] LUBRICATION SENSOR APPARATUS

[75] Inventors: Werner Strasser; Edward C. Lewis, both of Lexington, Ky.

[73] Assignee: Texas Instruments Incorporated, Dallas, Tex.

[21] Appl. No.: 945,422

[22] Filed: Dec. 22, 1986

Related U.S. Application Data

[63] Continuation-in-part of Ser. No. 818,836, Jan. 14, 1986, abandoned.

[51] Int. Cl.[4] .... G01L 7/16 G01L; 9/00; H01H 35/38
[52] U.S. Cl. .................................. 73/745; 200/82 E
[58] Field of Search ............... 73/745, 744, 38, 746, 73/707; 200/82 E, 34

[56] References Cited

U.S. PATENT DOCUMENTS 3,375,720 4/1968 Whiting .............................. 73/744
4,645,887 2/1987 Whiting .............................. 73/745

FOREIGN PATENT DOCUMENTS

2640529 3/1978 Fed. Rep. of Germany ........ 73/745

Primary Examiner—Donald O. Woodiel
Attorney, Agent, or Firm—John A. Haug; James P. McAndrews; Melvin Sharp

[57] ABSTRACT

A pressure sensor probe has a first port connectable to a relatively low pressure source in a compressor crankcase and a second port connectable to a relatively high pressure source at the output of an oil pump. A shuttle is slidably disposed in a bore and has a first end which closes the first port when the difference in pressure between the two ports indicative of normal operation exceeds a selected value determined by the relative areas of the shuttle exposed to the respective pressures and by a coil spring which biases the shuttle away from the first port. A passage is formed between the shuttle and the bore leading from the second port to a force receiving surface on the high pressure side of the shuttle. The length and cross sectional area of the passage is selected to provide a desired dampening or time delay between the high pressure source and the force receiving surface. Indicator means responsive to the position of the shuttle is used to indicate the status of the oil differential between the two ports and, if desired, to control the actuation of the compressor motor.

33 Claims, 3 Drawing Sheets

LUBRICATION SENSOR APPARATUS

This is a continuation-in-part of Ser. No. 818,836 filed Jan. 14, 1986, now abandoned.

This invention relates generally to pressure sensing apparatus and more particularly to apparatus for sensing the pressure differential between two pressure sources.

In relatively large sealed piston type refrigerant compressors, for example in the order of five ton compressors, it is conventional to monitor lubrication pressure generated by an oil pump in order to prevent compressor operation when there is insufficient lubrication which would result in undue wear and even seizing up of the compressor.

Conventionally lubrication pressure is monitored by using a pair of bellows type gauge pressure sensors. One sensor is connected to the crankcase through a thin capillary tube while the other sensor is connected through such a tube to an output port of the oil pump. The two sensors are typically mechanically linked by means of a balanced beam. The balance can be changed by means of coil springs which are adjustable to yield imbalance if relative oil pressure value drops below a desired value.

Crankcase pressures vary and pulsate over a wide range dependent on temperature and type of thermal loading of the refrigeration system. The pressures also fluctuate with each reciprocation of each cylinder and with the movement of each lobe or tooth of the oil pump (e.g. 120 Hz). The dampening effect of the capillary tubes in combination with the relatively high mass of the sensors and linkage elements as well as mechanical friction causes this type of system to filter these variations rapidly, changing pressure fluctuations which would cause excessive wear of sensor components or premature indication of oil pressure loss. However, not only does mechanical vibration cause a high incident of capillary tube fracture, sensors of this type inherently have a high material content due to the relatively high forces to which they are subjected. That is, such sensors measuring gauge pressure are exposed to atmospheric pressure and need to be able to prevent freon leakage.

It has been proposed to locate a sensor within the oil pump housing itself to eliminate the need for external plumbing. For example, in U.S. Pat. No. 4,551,069 a piston is shown disposed in a tube separating the interior of the tube into a high pressure portion which communicates with the output of the oil pump and a low pressure portion which communicates with the suction of the oil pump. The piston is adapted to move into and out of engagement with a movable contact arm of a switch. However this arrangement results in excessive wear of the movable sensor parts due to the continuous movement of the piston with the cyclical pressure fluctuations mentioned above as well as the need for some other means to prevent nuisance tripping of the compressor motor if it is used to control the energization thereof as suggested in the patent. Further, the provision of switching electric current in an oil and freon environment is undesirable.

It is therefore an object of the present invention to provide a lubrication sensor which can indicate the differential pressure between pressure generated by an oil pump and that contained in a compressor crankcase which is inexpensive, long lasting and reliable. It is another object of the invention to provide a sensor which can give either an analog output of the quantitative level of the differential or an indication of the existence or nonexistence of sufficient pressure differential as an indication of the efficacy of lubrication. Yet another object is the provision of a sensor which has selected dampening means to obviate operation of the sensor caused by normal pressure fluctuations which may range, for example, from 20 psi negative to 180 psi positive for each stroke of the compressor piston as well as means to vary the amount of dampening effected in the sensor.

The above and other objects, features and advantages of the present invention will become apparent from the following description and the appended claims, taken in conjunction with the accompanying drawings which show by way of example preferred embodiments of the present invention and in which like component parts are designated by like reference numerals throughout the several figures.

SUMMARY OF THE INVENTION

Briefly, in accordance with the invention, an elongated sensor probe is provided with a bore having a first port at a first end thereof and a second port spaced axially from the first port. The probe is receivable in a threaded well of the oil pump housing with the lower end of the probe projecting into the crankcase of the compressor with the first port in communication therewith. The second port, radially located in the wall defining the bore, is connected to the output of the oil pump. A shuttle is slidably received in the bore with a coil spring disposed between the shuttle and a combination stop and sealing surface formed at the first end of the bore. The spring places a bias on the shuttle tending to move it away from the first end. A second stop is formed at the opposite end of the bore to limit movement of the shuttle in that direction and to ensure that the second port is never blocked.

According to a feature of the invention a piston is integrally attached to the shuttle at its distal end. The force receiving surface of the piston is formed of first and second portions.

A passage having a selected length and cross sectional area is formed between the second port and the second force receiving surface portion of the piston so that a certain period of time is required for oil to flow between the second port and the second force receiving surface portion of the piston. Several cross sectional configurations are described to provide different levels of dampening.

According to another feature of the invention indication means responsive to the position of the shuttle are attached to the probe to provide an indication of the differential pressure existing between the two ports and if desired, to control the energization of the compressor motor. In one embodiment a permanent magnet is formed adjacent the distal end of the piston and a reed switch is mounted on the probe adjacent to the second end of the bore.

When the oil pump is generating more pressure than the combination of the effective pressure of the crankcase oil and the coil spring, the shuttle will move toward the first end with the lower surface of the shuttle contacting the first stop and effectively closing the first port. In this position the magnet is in its lower most position and the normally closed reed switch is closed indicating normal lubricating function.

When the differential pressure between the ports decreases to a point below the calibrated level (calibrated through the relative force receiving areas on opposite sides of the shuttle and the spring rate of the coil spring) then the shuttle will move away from the first end and the magnet will move to a position to cause the reed switch to open to deenergize a circuit indicating a loss of lubricating function.

In another embodiment the portion of the piston adjacent its distal end is formed of material having high magnetic permeability and a coil having an intermediate tap is wound about the probe adjacent the second end of the bore. The outer portion of the coil is connected to a voltage source and the inner portion is connected to voltage responsive means so that as the shuttle moves between its stops, an analog signal will be produced representative of the differential pressure existing between the two ports.

BRIEF DESCRIPTION OF THE DRAWINGS

In the accompanying drawings.

DETAILED DESCRIPTION

Figure 1:
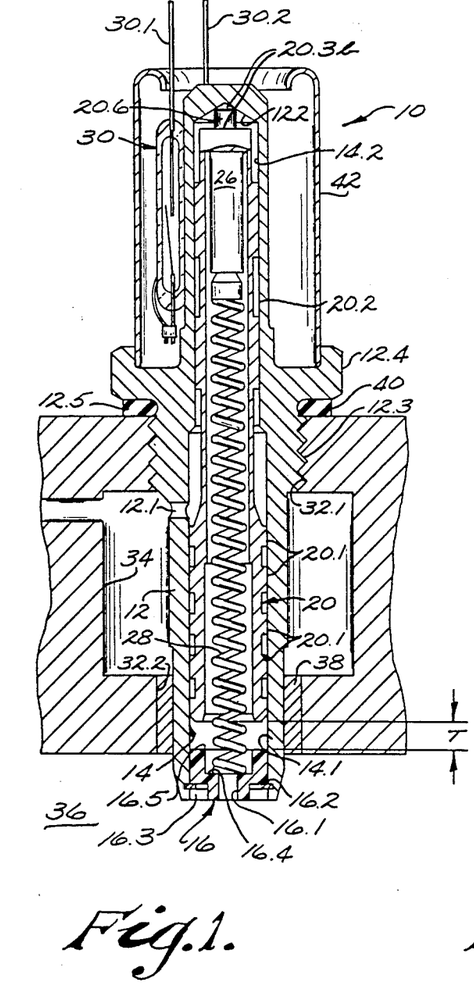
FIG. 1 is a cross sectional view taken through the longitudinal axis of the probe mounted in the well of an oil pump housing.
Figure 2:
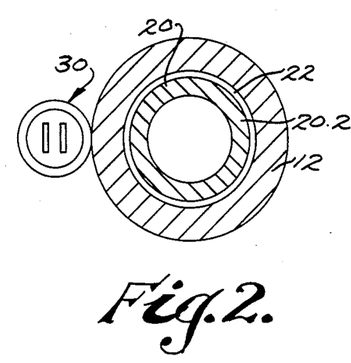
FIG. 2 is a cross sectional view taken on line 2—2 of FIG. 1 showing the reed switch and the piston of the sensor.
Figure 3:
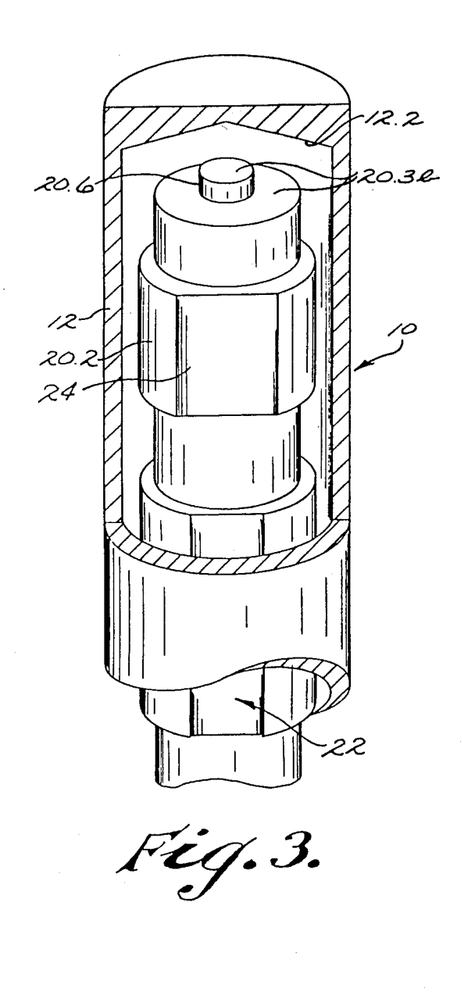
FIG. 3 is a perspective view, partly broken away, of the piston and second end of the bore in which the piston is disposed.

With particular reference to FIGS. 1–3 numeral 10 is used to designate generally a sensor probe made in accordance with the invention which comprises an elongated, generally cylindrical housing 12 formed of nonmagnetic material such as free cutting naval brass formed with a bore 14 extending essentially from bottom to top. Bore 14 has a large diameter portion 14.1 at its bottom and a smaller diameter portion 14.2 at its top. Bore 14 is closed at its bottom by a plug 16 which is provided with a first port 16.1 extending through the plug and preferably aligned with the longitudinal axis of bore 14. Plug 16 is retained in bore 14 in any suitable manner as by threading the bottom portion of bore 14 and the outer periphery of the plug or, as shown, by forming a circumferential groove 16.2 in housing 12 in communication with bore 14 and placing a retaining ring 16.3 in the groove. Plug 16 is formed with a recessed spring seat 16.4 and a sealing surface 16.5. Preferably plug 16 is formed of Teflon or other suitable material which forms an effective sealing surface.

Figure 1A:
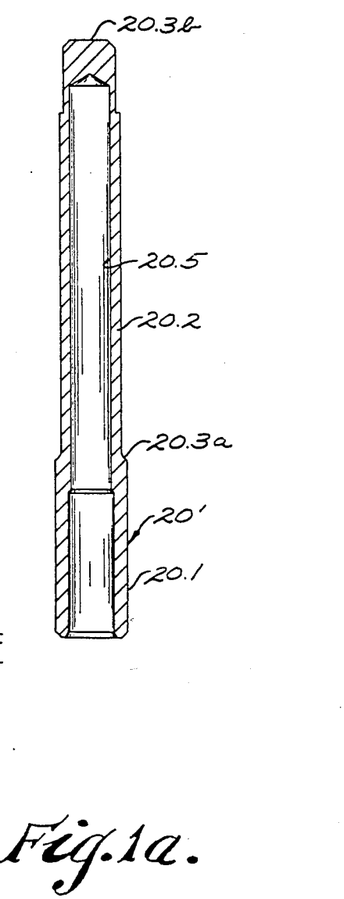
FIG. 1a is a cross sectional view taken through the longitudinal axis of a modified combination shuttle-piston useful in the FIG. 1 sensor.

A shuttle 20 formed of free cutting naval brass or other nonmagnetic material is slidably disposed in bore portion 14.1 and is formed with outer peripheral sealing surfaces 20.1 to effectively form a seal with the side wall defining bore 14.1. FIG. 1 shows a plurality of annular recesses spaced axially along shuttle 20 in the sealing surfaces 20.1 as well as in the dampening passage area to be discussed below in order to provide space for contaminants and the like which might otherwise tend to mar the surfaces if caught between the shuttle and the bore. Alternatively, the sealing surface 20.1 and passageway surfaces may be formed without such recesses if desired as shown in FIG. 1a.

A second port 12.1 is formed in the side wall defining bore 14 and extends in a radial direction through the side wall at a location spaced axially from the port 16.1 such that shuttle 20 is able to slide up and down a selected distance between the two ports. Surface 16.5 of plug 16 forms a stop for the shuttle when moving in the downward direction as seen in FIG. 1 and upper stop surface 12.2 limits upward movement as seen in FIG. 1. It will be understood that the stop limiting motion in the upward direction could be located at other locations. For example, it could be in the form of a radially extending flange at its lower end combined with an enlarged counterbore of bore 14 so that the stop could serve as a dual function of sealing the high pressure port when the shuttle is in its upper extremity.

Shuttle 20 is itself formed with a bore 20.5 extending along its longitudinal axis essentially along its entire length but closed at its top end portion. A permanent magnet 26 is disposed at the closed end of bore 20.5 and is biased thereagainst by a coil spring 28 which extends from seal 16.4 to the magnet 26.

Shuttle 20 is provided with an extension 20.2 which may be integrally formed with the main body. Extension 20.2 serves as a piston and has first and second force receiving surface portions 20.3 $a$ and $b$.

Figures 2A, 2B:
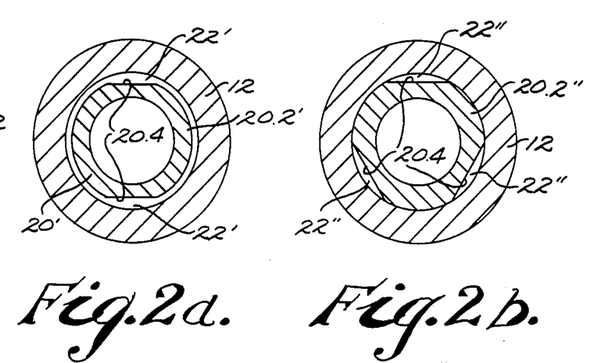
FIG. 2a is similar to FIG. 2 without the reed switch and showing a modification of the piston configuration.
FIG. 2b is similar to FIG. 2a showing a further modification of the piston configuration.

The mass of shuttle 20 in combination with the spring rate of spring 28 is selected to yield a natural frequency of less than 20 Hz which makes the sensor insensitive to the 120 Hz main frequency of differential pressure pulsation generated by the oil pump and compressor piston. To further lower the response time of shuttle 20 to less than 1 Hz a passageway 22 having a selected length and cross sectional area is formed in extensions 20.2 extending from force receiving surface portion 20.3$b$ to port 12.1. In cross section the passage is defined by the space between extension 20.2 and the side wall of housing 12 which defines bore 14.2 which can be seen in FIG. 2 as an annular space. The length of the passage and its cross sectional area as well as the ratio between area 20.3$a$ and 20.3$b$ determine the dampening effect that the sensor has relative to the pressure fluctuations. The configuration depicted in FIG. 2 represents one degree of dampening. By way of example in a sensor constructed in accordance with the invention shuttle 20' of FIG. 1a including extension 20.2 was 2.50 inches long of which extension 20.2 comprised 1.75 inches. The outer diameter of the large diameter portion which comprises the major portion of the length of extension 20.2 was approximately 0.2480 inches. The diameter of bore 14.2 was approximately 0.2500 inch. The difference in diameters of bore 14.2 and extension 20.2 therefor resulted in a clearance of 0.002 inch for passage 22 (FIG. 2). If it is desired to lessen the dampening effect the outer peripheral surface of the generally cylindrical extension can be provided with a flattened portion 20.4 extending parallel to the longitudinal axis as seen in FIG. 3 thereby increasing the cross sectional area. Still less dampening is provided with a pair of flattened surfaces providing an enlarged passage 22' seen in FIG. 2a or even more flattened surfaces 20.4 providing even a greater enlarged passage 22" seen in FIG. 2b.

Shuttle 20 in effect floats in bore 14.1 with one end exposed to normally relatively high pressure (port 12.1) and its opposite end exposed to normally relatively low pressure (port 16.1). In order for the lubrication pressure to exert its force onto force receiving surface 20.3b, the oil has to make its way through the passage into the chamber at the top end of the bore. The viscosity of the oil, the length and cross sectional area of the passage, the amount of the differential pressure and the length of motion of shuttle 20 between its stops (distance "T" shown in FIG. 1) determine the time the shuttle requires to move to the bottom stop. As the differential pressure decreases below the selected or calibrated value, the pressure at port 16.1 along with the force exerted by spring 28 in effect attempt to reset the shuttle to the top stop position however the oil at the top of the bore has to be displaced back through the passage in a direction opposite to the motion of the shuttle thereby increasing the apparent viscosity of the oil and resulting in a very slow reset motion.

A reed switch 30 is mounted on housing 12 adjacent to the upper end of bore 14.2 and has first and second electrical contacts adapted to move into and out of engagement in response to the position of magnet 26. The position of shuttle 20 and concomitantly magnet 26 is determined by the differential in the pressure of oil between the two ports 16.1 and 12.1. When the differential is greater than the selected or calibrated value then the shuttle moves downwardly until limited by surface 16.5 which acts both as a stop and as a seal effectively closing port 16.1. This is the position of shuttle 20 during normal operation of the compressor. In that position magnet 26 would be in its lowermost position allowing the reed contacts to move to their normally closed position energizing a circuit through leads 30.1 and 30.2 indicative that normal lubrication is being provided. When the differential decreases below the calibrated level, shuttle 20 moves upwardly under the influence of the oil pressure received through port 16.1 and the bias of spring 28 until motion of the shuttle is limited by stop surface 12.2. In that position magnet 26 is in its uppermost position thereby causing the reed switch contacts to open and deenergize the circuit indicating that a low pressure condition exists and that the lubrication function is impaired.

Calibration of the sensor is dependent upon the relative force receiving areas, i.e. force receiving surface 20.3 a and b on the high pressure side of piston 20.2 and the force receiving surfaces on the low pressure side of shuttle 20 including the bottom surface of the shuttle and the bottom surface of the closed end of bore 20.5 in addition to the force exerted by spring 28.

A sensor made in accordance with the invention employed a spring selected so that 15 psi differential pressure resulted in the calibrated level. That is, if the differential is higher than 15 psi, the shuttle 20 is at the stop 16.5 indicative of sufficient lubrication. If oil pressure drops below 15 psi, the shuttle will move toward stop surface 12.2 indicative of low lubrication pressure.

The length of the portion of shuttle 20 having sealing surface 20.1 is such relative to the location of projection 20.6 and stop surface 12.2 that port 12.1 is always open so that oil pressure at port 12.1 is always in communication with force receiving surface portions 20.3 a and b of piston 20.2.

Housing 12 is formed with a threaded portion 12.3 intermediate its ends which is adapted to screw into a threaded bore 32.1 in the housing 32 of an oil pump. A well 34 is connected to the high pressure output of the oil pump. Another bore 32.2 leads to the low pressure crankcase 36 of a refrigerator compressor with the bottom tip portion of probe 10 extending into the crankcase so that port 16.1 is in communication therewith. A suitable seal 38 seals the crankcase from well 34.

Housing 12 is provided with a hexagonal portion 12.4 to facilitate screwing in of the probe and has a bottom surface 12.5 which forms a seal with packing washer 40 compressed between surface 12.5 and housing 32. Preferably a cylindrical sleeve 42 of steel or other ferromagnetic material is mounted on the top surface of hexagonal portion 12.4 and extends upwardly beyond the reed switch to provide magnetic shielding of the switch and sensor components.

Figures 4, 5:
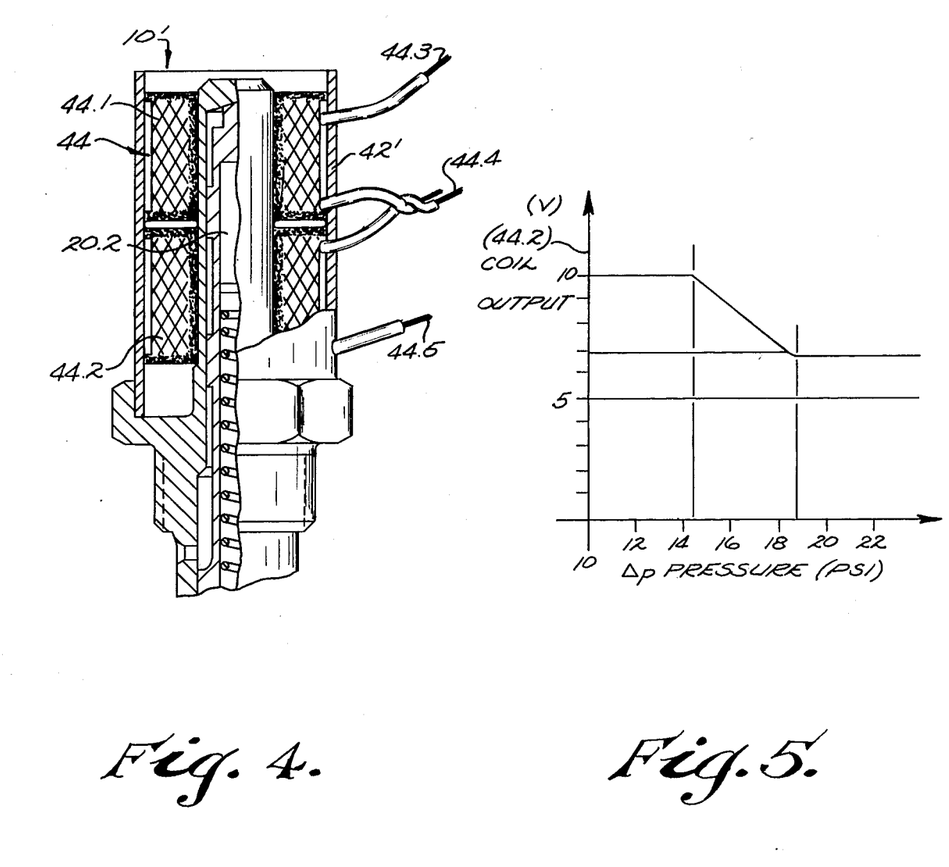
FIG. 4 is an elevational view, partly in cross section, of the second end of a second embodiment of the probe.
FIG. 5 is a graph of voltage output versus differential pressure for the FIG. 4 embodiment.

FIG. 4 shows an alternate embodiment in which an analog output indicative of the varying pressure differential can be obtained. A coil 44 has a first portion 44.1 wound about housing 12 at its top end portion with a second portion 44.2 wound about housing 12 adjacent to the first portion. An input voltage energizing lead 44.3 and intermediate tap 44.4 are coupled to a voltage source such as 20 volt, 60 Hz, 40 ma while output lead 44.5 and tap 44.4 are coupled to voltage responsive means such as a voltmeter. The upper portion of piston 20.2 is formed of magnetically high permeability material so that an output voltage will be obtained which will vary based on the position of the upper end of piston 20.2 which in turn is dependent upon the differential oil pressure as seen in FIG. 5. As in the previous embodiment, a sleeve 42' is preferably provided for magnetic shielding.

Figure 6:
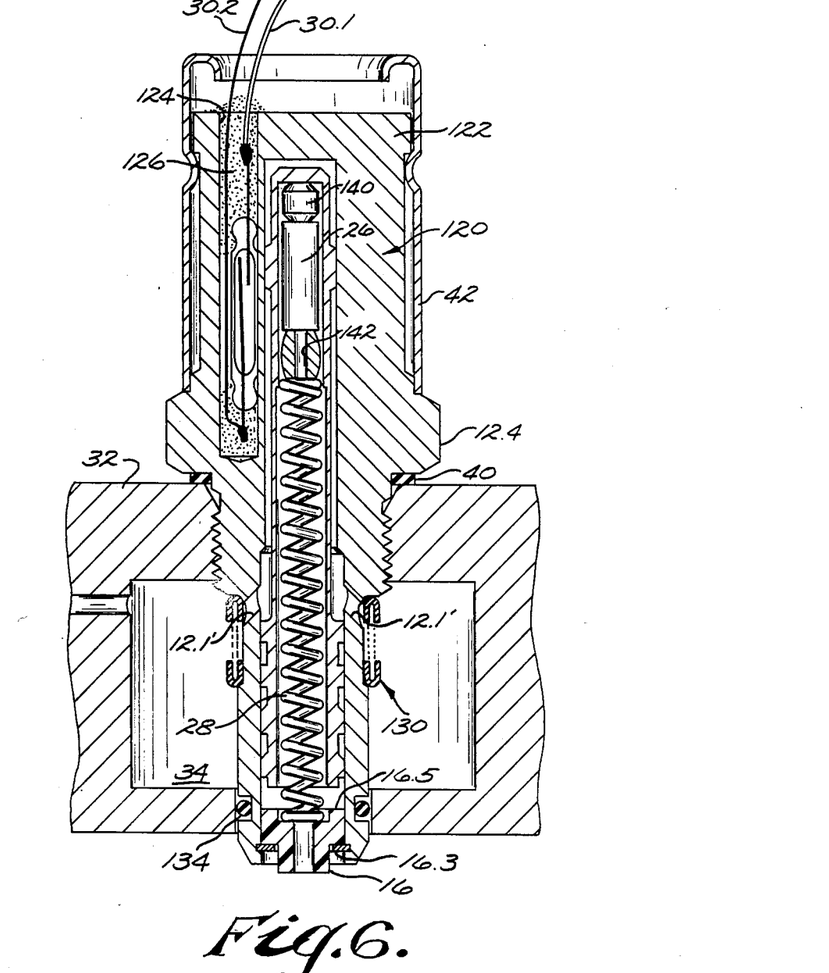
FIG. 6 is a sectional view similar to FIG. 1 of a modified probe made in accordance with the invention.

FIG. 6 shows an embodiment which includes several modifications compared to the FIG. 1 structure. In FIG. 1 reed switch 30 is mounted on housing 12 so that the remaining space between housing 12 and shield 42 can be infilled with epoxy material. In FIG. 6 however housing 120 is shown with a larger diameter at its upper end 122 and a switch receiving bore 124 is formed closely adjacent to bore 14. Switch receiving bore 124 has a diameter slightly larger than the diameter of the envelope of reed switch 30. Switch 30 can be locked in place with a thin layer of epoxy 126 around the circumference of the envelope or it could be wrapped in a film of suitable material so that it could be removed if desired. In either approach the FIG. 6 embodiment provides improved balancing of forces caused by thermal expansion differences among the housing 120, epoxy or other suitable wrapping material and the glass envelope causing these force to act symmetrically on the reed switch.

Also provided in the FIG. 6 embodiment is a high pressure filter 130 comprising a screen sleeve fitted over port 12.1'. The screen of filter 130 has a plurality of apertures each having a size small enough to prevent passage of any particle larger than the smallest dimension of the cross sectional area of dampening passage 22.

Seal 38 shown in FIG. 1 has been modified to employ a conventional "O" ring member 134 received in a groove formed in the outer periphery of housing 120.

Another modification shown in FIG. 6 is the use of spacers 140, 142 formed of nonmagnetic material. Spacers 140, 142 are chosen to have respective lengths selected to provide the desired axial relation between magnet 26 and reed switch 30.

Figure 7:
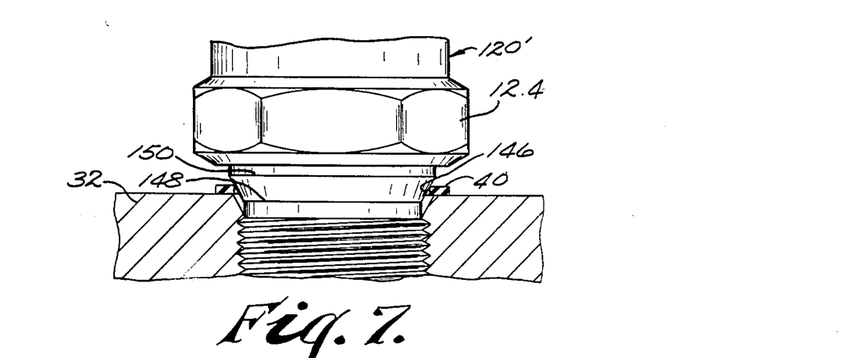
FIG. 7 is a partial section of the oil pump housing showing the hexagonal mounting portion of the probe.

FIG. 7 shows a modification which ensures that packing washer 40 is disposed concentrically with respect to the threaded bore in housing 32. Housing 120' is provided with a tapered portion 146 disposed adjacent the threaded portion extending between a minimum diameter at 148 closest to the threaded portion and a maximum diameter 150. Packing washer 40 is formed with a bore having a diameter intermediate these values so that as the probe is screwed into the pump housing, the packing washer will automatically be centered. This is particularly relevant when the probe is mounted in a horizontal position rather than vertical as shown.

As noted above, in accordance with the invention the shuttle is slideably disposed in bore 14 separating the high and low pressure ports. A selected difference in diameters between the bore and the shuttle provides a gap permitting flow of pressure media between the parts providing in effect a floating of the shuttle whether the media is oil or gas thereby reducing the pressure required to axially displace the shuttle relatively independent of surface finishes of the bore and shuttle. The surface area to weight ratio of the shuttle is chosen to cause floating of the shuttle in all usable sensor positions.

Filter 130 prevents entry of particles which could interfere with the shuttle movement while spring 28 acts as a filter for the low pressure port preventing entry of solids due to small size of the spiral gap (e.g. less than 150 microns).

While specific embodiments of the invention have been illustrated and described herein, it is realized that numerous modifications and changes will occur to those skilled in the art. For example it is within the purview of the invention to use a Hall Effect sensor or similar device rather than reed switch 30 to provide the indication means.

What is claimed is:

1. Apparatus for sensing a fluid pressure differential between first and second ports connected respectively to low and high pressure sources comprising a housing having a bore having a longitudinal axis, the bore extending between first and second ends, the second end being closed, a shuttle having a first portion having a selected axial length with a fluid sealing surface about its periphery slidably received in the bore between first and second extremities, a low pressure source, a first port connected to the low pressure source and with the first end of the bore, a second port connected to the high pressure source and with the bore at a location spaced axially from the first end, the axial length of the first portion being less than the distance between the first extremity and the second port, the shuttle having a second portion having a selected axial length and having a force receiving surface in communication with the second port adapted to place a force on the shuttle tending to move the shuttle toward the first end of the bore, the force receiving surface positioned axially between the second port and the second extremity when the shuttle is at the first extremity, dampening means to increase the time in which the shuttle responds to a change in differential pressure, the dampening means including a passage means formed along the length of the second portion in communication with the second port and leading to the force receiving surface of the shuttle, the passage means configured such that the fluid received in the second end of the bore between the shuttle and the closed end when the fluid pressure differential is sufficiently high to cause the shuttle to move toward the first end of the bore having to be displaced through the passage in a direction opposite to the movement of the shuttle for the shuttle to thereafter move away from the first end of the bore when the fluid pressure differential decreases, means to bias the shuttle in a direction toward the high pressure, second end of the bore and means to calibrate the apparatus so that during normal operation the shuttle is located at the first end of the bore.

2. Apparatus according to claim 1 in which the shuttle includes a portion formed of magnetic material and sensing means is disposed on the housing responsive to the position of the shuttle including a magnetic reed switch mounted on the housing adjacent to the bore.

3. Apparatus for sensing a fluid pressure differential between first and second ports comprising a housing having a bore having a longitudinal axis, the bore extending between first and second ends, a shuttle having a first portion having a selected axial length with a fluid sealing surface about its periphery slidably received in the bore between first and second extremities, a first port connected with the first end of the bore, a second port connected with the bore at a location spaced axially from the first end, the axial length of the first portion being less than the distance between the first extremity and the second port, the shuttle having a second portion having a selected axial length and having a force receiving surface in communication with the second port adapted to place a force on the shuttle tending to move the shuttle toward the first end of the bore, the force receiving surface positioned axially between the second port and the second extremity when the shuttle is at the first extremity, dampening means to increase the time in which the shuttle responds to a change in differential pressure, the dampening means including a passage formed along the length of the second portion in communication with the second port and leading to the force receiving surface of the shuttle, means to bias the shuttle in a direction toward the second end of the bore, the shuttle including a portion formed of magnetically high permeability material, the bore being defined by a cylindrical portion of the housing and a coil having an input, an output and an intermediate tap disposed on the cylindrical portion of the housing with energizing means coupled between the input and the tap and output sensing means coupled between the output and tap.

4. Apparatus according to claim 1 in which the first port is aligned with the longitudinal axis.

5. Apparatus according to claim 4 in which the first extremity is defined by a first stop formed at the first end of the bore to limit travel of the shuttle in the direction toward the first end of the bore.

6. Apparatus according to claim 5 in which the first stop forms a sealing surface and the shuttle has a first end surface engagable with the sealing surface to close the first port.

7. Apparatus according to claim 5 in which the second extremity is defined by a second stop formed at the second end of the bore to limit travel of the shuttle in the direction toward the second end of the bore.

8. Apparatus according to claim 1 in which the bore is defined by a cylindrical wall and the second port is formed in the cylindrical wall.

9. Apparatus for sensing a fluid pressure differential between first and second ports comprising a housing having a bore having a longitudinal axis, the bore extending between first and second ends, a shuttle having a first portion having a selected axial length with a fluid sealing surface about its periphery slidably received in the bore between first and second extremities, a first port connected with the first end of the bore, second port connected with the bore at a location spaced axially from the first end, the axial length of the first portion being less than the distance between the first extremity and the second port, the shuttle having a second axial portion having a selected axial length and having a force receiving surface in communication with the second port adapted to place a force on the shuttle tending to move the shuttle toward the first end of the bore, the force receiving surface positioned axially between the second port and the second extremity when the shuttle is at the first extremity, dampening means to increase the time in which the shuttle responds to a change in differential pressure, the dampening means including a passage formed along the length of the second portion in communication with the second port and leading to the force receiving surface of the shuttle, the second axial portion of the shuttle being generally cylindrical and the passage being formed by providing a flat surface on its outer periphery to obtain a selected degree of dampening and means to bias the shuttle in a direction toward the second end of the bore.

10. Apparatus according to claim 1 in which the first extremity is defined by a first stop formed at the first end of the bore to limit travel of the shuttle in the direction toward the first end of the bore, the first stop forming a sealing surface and the shuttle having a first end surface engageable with the sealing surface to close the first port whereby the flow of fluid through the bore is prevented during normal operation.

11. Apparatus according to claim 1 in which the fluid sealing surface is formed with a plurality of recesses extending about the periphery of the shuttle.

12. Apparatus according to claim 1 in which the second portion of the shuttle is formed with an enlarged periphery extending along only a portion of the axial length of the second portion, the enlarged periphery being located intermediate the ends thereof and forming part of the passage means.

13. Apparatus according to claim 1 further including a shield of ferromagnetic material mounted on the housing adjacent to the bore and extending around the periphery of the housing.

14. Apparatus for sensing a fluid pressure differential between first and second ports connected respectively to low and high pressure sources comprising a housing having a bore defined by a cylindrical wall extending between first and second ends, the second end being closed, a shuttle having a portion with a fluid sealing surface about its periphery slidably received in the bore, a low pressure source, a first port connected to the low pressure source and with the first end of the bore, a high pressure source, a second port formed in the cylindrical wall connected to the high pressure source and with the bore at a location spaced axially from the first end, the portion of the shuttle having an axial length less than the axial distance between the first and second ports, the shuttle having a force receiving surface, a passage means formed on the shuttle leading to the force receiving surface of the shuttle in communication with the second port adapted to place a force on the shuttle tending to move the shuttle toward the first end of the bore, the passage means configured such that the fluid received in the second end of the bore between the shuttle and the closed end when the fluid pressure differential is sufficiently high to cause the shuttle to move toward the first end of the bore having to be displaced through the passage in a direction opposite to the movement of the shuttle for the shuttle to thereafter move away from the first end of the bore when the fluid pressure differential decreases, means to bias the shuttle in a direction toward the high pressure, second end of the bore, means to calibrate the apparatus so that during normal operation the shuttle is located at the first end of the bore and sensing means disposed on the housing outside of the bore responsive to the position of the shuttle.

15. Apparatus according to claim 14 in which the shuttle includes a portion formed of magnetic material and the sensing means includes a magnetic reed switch mounted on the housing adjacent to the bore.

16. Apparatus for sensing a fluid pressure differential between first and second ports comprising a housing having a bore defined by a cylindrical wall extending between first and second ends, a shuttle having a portion with a fluid sealing surface about its periphery slidably received in the bore, a first port connected with the first end of the bore, a second port formed in the cylindrical wall connected with the bore at a location spaced axially from the first end, the portion of the shuttle having an axial length less than the axial distance between the first and second ports, the shuttle having a force receiving surface, a passage formed on the shuttle leading to the force receiving surface of the shuttle in communication with the second port adapted to place a force on the shuttle tending to move the shuttle toward the first end of the bore, the shuttle including a portion formed of magnetically high permeability material, a coil having an input, an output and an intermediate tap disposed on the housing with energizing means coupled between the input and the tap and output sensing means coupled between the output and the tap means to bias the shuttle in a direction toward the second end of the bore and sensing means disposed on the housing outside of the bore responsive to the position of the shuttle.

17. Apparatus according to claim 14 in which the bore has a longitudinal axis and the first port is aligned with the longitudinal axis.

18. Apparatus according to claim 17 further including a first stop formed at the first end of the bore to limit travel of the shuttle in the direction toward the end of the bore.

19. Apparatus according to claim 17 in which the first stop forms a sealing surface and the shuttle has a first end surface engageable with the sealing surface to close the first port.

20. Apparatus according to claim 17 further including a second stop formed at the second end of the bore to limit travel of the shuttle in the direction toward the second end of the bore.

21. Apparatus according to claim 14 in which the second port is formed in the cylindrical wall.

22. Apparatus for sensing a fluid pressure differential between first and second ports comprising a housing having a bore defined by a cylindrical wall extending between first and second ends, a shuttle having a portion with a fluid sealing surface about its periphery slidably received in the bore, a first port connected with the first end of the bore, a second port formed in the cylindrical wall connected with the bore at a location spaced axially from the first end, the portion of the shuttle having an axial length less than the axial distance between the first and second ports, the shuttle having a force receiving surface, a passage formed on the shuttle leading to the force receiving surface of the shuttle in communication with the second port adapted to place a force on the shuttle tending to move the shuttle toward the first end of the bore, the shuttle being generally cylindrical and the passage being formed by providing a flat surface on the outer periphery of the shuttle to obtain a selected degree of dampening, means to bias the shuttle in a direction toward the second end of the bore and sensing means disposed on the housing outside of the bore responsive to the position of the shuttle.

23. Apparatus according to claim 22 in which the passage is formed by providing a plurality of flat surfaces on the outer periphery of the shuttle to obtain a selected degree of dampening.

24. Apparatus for sensing a fluid pressure differential between first and second ports connected respectively to low and high pressure sources comprising a housing formed with a bore having a longitudinal axis, the bore extending between first and second ends, the second end being closed, a shuttle having a first portion having a selected axial length slidably received in the bore, the first portion having an outer peripheral surface matching that of the bore but slightly smaller to permit floating movement between first and second extremities, a low pressure source, a first port connected to the low pressure source and with the first end of the bore, a high pressure source, a second port connected to the high pressure source and with the bore at a location spaced axially from the first end, the axial length of the first portion being less than the distance between the first extremity and the second port, the shuttle having a second portion having a selected length and having first and second force receiving surfaces in communication with the second port adapted to place a force on the shuttle tending to move the shuttle toward the first end of the bore, the second force receiving surface positioned axially between the second port and the second extremity when the shuttle is at the first extremity, dampening means to increase the time in which the shuttle responds to a change in differential pressure, the dampening means including a passage means formed along the length of the second portion in communication with the second port, the passage leading to the second force receiving surface of the shuttle at an end thereof, the passage means configured such that the fluid received in the second end of the bore between the shuttle and the closed end when the fluid pressure differential is sufficiently high to cause the shuttle to move toward the first end of the bore having to be displaced through the passage in a direction opposite to the movement of the shuttle to thereafter move away from the first end of the bore when the fluid pressure differential decreases, means to bias the shuttle in a direction toward the high pressure, second end of the bore and means to calibrate the apparatus so that during normal operation the shuttle is located at the first end of the bore.

25. Apparatus according to claim 24 further comprising filter means mounted on the housing over the second port to limit the size of particles passing into the second port.

26. Apparatus according to claim 25 in which the filter means comprises a body having a plurality of apertures each having a size small enough to prevent passage of any particle larger than the smallest dimension of the cross sectional area of the dampening passage.

27. Apparatus according to claim 24 in which the shuttle includes a portion formed of magnetic material and in which the housing is formed with a switch bore closely adjacent to the bore in which the shuttle is received and a magnetic reed switch is received in the switch bore, the reed switch being responsive to the position of the shuttle.

28. Apparatus according to claim 27 in which the switch bore has a diameter slightly larger than the diameter of the reed switch and the switch is fixedly mounted in the switch bore with a thin layer of epoxy material about the circumference of the switch.

29. Apparatus according to claim 24 in which the housing is of a generally cylindrical configuration and is provided with a threaded portion on its outer surface and a tapered portion is disposed adjacent the threaded portion extending between a minimum diameter closest to the threaded portion and a maximum diameter and a packing washer having a centering hole with a diameter between the minimum and maximum diameters of the tapered portion is received on the housing whereby the packing washer is automatically centered when the housing is screwed into a mating threaded bore in fluid reservoir containing means.

30. Apparatus for sensing a fluid pressure differential between first and second ports comprising a housing formed with a bore having a longitudinal axis, the bore extending between first and second ends, a shuttle having a first portion having a selected axial length slidably received in the bore, the first portion having an outer peripheral surface matching that of the bore but slightly smaller to permit floating movement between first and second extremities, a first port connected with the first end of the bore, a second port connected with the bore at a location spaced axially from the first end, the axial length of the first portion being less than the distance between the first extremity and the second port, the shuttle having a second portion having a selected length and having first and second force receiving surfaces in communication with the second port adapted to place a force on the shuttle tending to move the shuttle toward the first end of the bore, the second force receiving surface positioned axially between the second port and the second extremity when the shuttle is at the first extremity, the shuttle including a portion formed of magnetic material, dampening means to increase the time in which the shuttle responds to a change in differential pressure, the dampening means including a passage formed along the length of the second portion in communication with the second port, the passage leading to the second force receiving surface of the shuttle at an end thereof, means to bias the shuttle in a direction toward the second end of the bore, the housing being formed with a switch bore closely adjacent to the bore in which the shuttle is received, a magnetic reed switch received in the switch bore, the reed switch being responsive to the position of the shuttle, the shuttle being formed with magnet receiving bore and the portion formed of magnetic material being a permanent magnet received and locked in the bore.

31. Apparatus according to claim 30 in which the switch bore has a closed end and further including a spacer formed of nonmagnetic material of a selected length disposed in the bore between the closed end and the permanent magnet to adjust the axial relation between the permanent magnet and the reed switch.

32. Apparatus for sensing a fluid pressure differential between first and second ports connected respectively to low and high pressure sources comprising a housing having a bore having a longitudinal axis, the bore extending between first and second ends, the second end being closed, a shuttle having a first portion having a selected axial length with a fluid sealing surface about its periphery slidably received in the bore between first and second extremities, a low pressure source, a first port connected to the low pressure source and with the first end of the bore, a high pressure source, a second port connected to the high pressure source and with the bore at a location spaced axially from the first end, the axial length of the first portion being less than the distance between the first extremity and the second port, the shuttle having a second portion having a selected axial length and having first and second force receiving surfaces in communication with the second port adapted to place a force on the shuttle tending to move the shuttle toward the first end of the bore, dampening means to increase the time in which the shuttle responds to a change in differential pressure, the dampening means including a passage means formed along the length of the second portion in communication with the second port and leading to only one of the first and second force receiving surfaces of the shuttle, the passage means configured such that the fluid received in the second end of the bore between the shuttle and the closed end when the fluid pressure differential is sufficiently high to cause the shuttle to move toward the first end of the bore having to be displaced through the passage in a direction opposite to the movement of the shuttle for the shuttle to thereafter move away from the first end of the bore when the fluid pressure differential decreases, means to bias the shuttle in a direction toward the high pressure, second end of the bore and means to calibrate the apparatus so that during normal operation the shuttle is located at the first end of the bore.

33. Apparatus for sensing a fluid pressure differential between first and second ports comprising a housing having a bore having a longitudinal axis, the bore extending between first and second ends, a shuttle formed with a magnet receiving bore and a permanent magnet received and locked on the bore, the shuttle having a fluid sealing surface about its periperhy slidably received in the bore between first and second extremities, a first port connected with the first end of the bore, a second port connected with the bore at a location spaced axially from the first end, the shuttle having a force receiving surface in communication with the second port adapted to place a force on the shuttle tending to move the shuttle toward the first end of the bore, dampening means to increase the time in which the shuttle responds to a change in differential pressure, the dampening means including a passage formed in the shuttle in communication with the second port and leading to the force receiving surface of the shuttle, means to bias the shuttle in a direction toward the second end of the bore and a magnetic reed switch mounted closely adjacent to the bore on which the shuttle is received, the switch being responsive to the position of the shuttle.

* * * * *